(12) United States Patent
Chen et al.

(10) Patent No.: US 10,008,905 B2
(45) Date of Patent: Jun. 26, 2018

(54) HOLLOW MOTOR MODULE

(71) Applicant: PRECISION MACHINERY RESEARCH & DEVELOPMENT CENTER, Taichung (TW)

(72) Inventors: Che Chien Chen, Taichung (TW); Han Pei Wang, Taichung (TW)

(73) Assignee: Precision Machinery Research & Development Center, Taichung (TW)

( * ) Notice: Subject to any disclaimer, the term of this patent is extended or adjusted under 35 U.S.C. 154(b) by 454 days.

(21) Appl. No.: 14/923,983

(22) Filed: Oct. 27, 2015

(65) Prior Publication Data

US 2016/0156249 A1    Jun. 2, 2016

(30) Foreign Application Priority Data

Dec. 2, 2014    (TW) .............................. 103141715 A (51) Int. Cl.
*H02K 16/02* (2006.01)
*H02K 7/116* (2006.01)
*H02K 1/27* (2006.01)
*H02K 1/17* (2006.01)

(52) U.S. Cl.
CPC ............. *H02K 7/116* (2013.01); *H02K 16/02* (2013.01); *H02K 1/17* (2013.01); *H02K 1/2706* (2013.01); *H02K 1/276* (2013.01)

(58) Field of Classification Search
CPC ........ H02K 16/02; H02K 7/116; H02K 16/00; H02K 16/005; H02K 7/10; H02K 1/17; H02K 1/27; F16H 3/725; F16H 1/22

USPC .......... 310/112–115, 83, 99, 154.33, 154.32, 310/156.36, 156.37
See application file for complete search history.

(56) References Cited

U.S. PATENT DOCUMENTS

| | | | | |
|---|---|---|---|---|
| 1,785,965 | A * | 12/1930 | Major ................... | H02K 47/04 307/84 |
| 4,691,119 | A * | 9/1987 | McCabria .............. | H02K 7/116 290/4 C |
| 8,757,119 | B2 * | 6/2014 | Suzuki .................... | B60K 6/00 123/179.25 |
| 8,810,099 | B2 * | 8/2014 | Huang ................ | H02K 49/102 310/112 |
| 2008/0098588 | A1 * | 5/2008 | Bremner ............. | H02K 21/029 29/598 |

(Continued)

FOREIGN PATENT DOCUMENTS

WO    WO 2006126486 A1 *  11/2006  ............. H02K 7/116

*Primary Examiner* — Joshua Benitez Rosario
*Assistant Examiner* — Alexander Moraza
(74) *Attorney, Agent, or Firm* — Rosenberg, Klein & Lee (57) ABSTRACT

A hollow motor module as a combination of a motor and a speed reducer is disclosed. The motor includes an outer stator, a first rotor and a plurality of second rotors. The first rotor is peripherally provided with a first coil and is installed in the outer stator. Each of the plural second rotors is peripherally provided with a second coil and is installed in the first rotor. The second rotor has a coupling portion extending out of the first rotor. The outer stator has first magnets that work with the first coil to magnetically excite the first rotor to rotate. The first rotor has second magnets for the second rotors. The second magnets work with the corresponding second coils to magnetically excite the second rotors to rotate synchronously. The speed reducer is connected to the coupling portions of the second rotors.

3 Claims, 7 Drawing Sheets

(56) References Cited

U.S. PATENT DOCUMENTS

| | | | |
|---|---|---|---|
| 2009/0058214 A1* | 3/2009 | Mizushima | H02K 7/116 310/203 |
| 2010/0156221 A1* | 6/2010 | Dooley | H02K 7/116 310/114 |
| 2012/0025644 A1* | 2/2012 | Ogawa | B60K 7/0007 310/83 |
| 2014/0319948 A1* | 10/2014 | Nagase | H02K 5/145 310/83 |

* cited by examiner

HOLLOW MOTOR MODULE

BACKGROUND OF THE INVENTION

1. Technical Field

The present invention relates to motors, and more particularly to a hollow motor module that reduces speed before outputting power.

2. Description of Related Art

Figure 7:
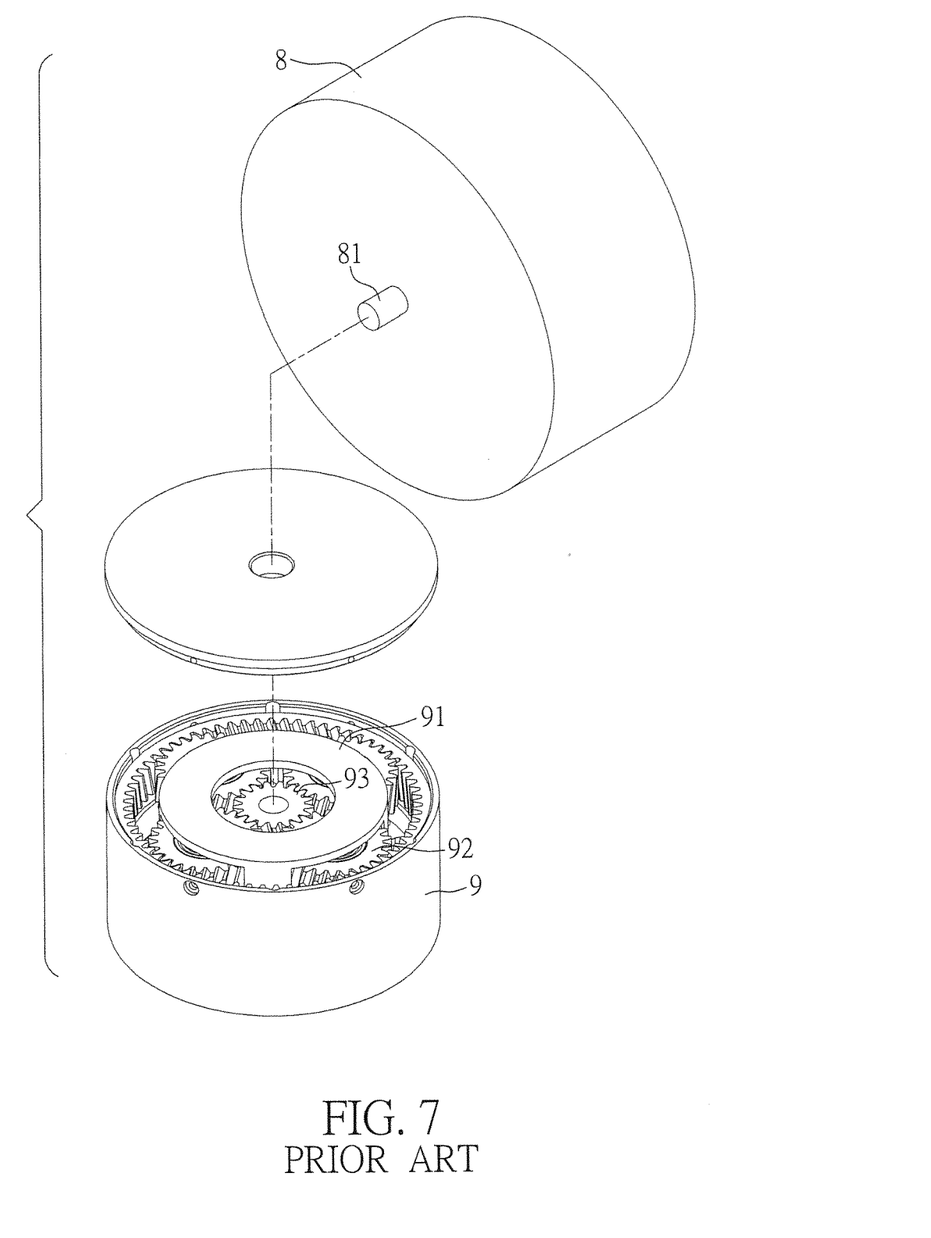
FIG. 7 shows a conventional motor module with its motor to be assembled to a first-stage reducing part of its speed reducer.

FIG. 7 depicts a conventional motor module, which comprises a motor 8 and a speed reducer 9. The speed reducer 9 has its front section containing a speed-reducing gear set that includes a rotatory seat 91, planetary gears 92 and a sun gear 93. The planetary gears 92 are arranged in to a circle that they center the rotatory seat 91. The sun gear 93 is placed at the center of the planetary gear 92. The motor 8 has its output shaft 81 connected to the sun gear 93, so as to drive the sun gear 93 to rotate the planetary gears 92, thereby achieving first-stage deceleration. Then the rotatory seat 91 drives another speed-reducing gear set at the rear section (not shown) to operate. The speed-reducing gear set in the rear section is also composed of a sun gear and planetary gears like the one in the front section, so as to achieve second-stage deceleration.

In the conventional motor module as described above, only when the sun gear 93 of the speed-reducing gear set in the front section is connected to the output shaft 81 of the motor 8, the speed reducer 9 can decelerate the rotation of the output shaft of the motor. In addition, an additional sun gear has to be provided in the speed-reducing gear set in the rear section. These make the prior-art device need structural improvement.

BRIEF SUMMARY OF THE INVENTION

The primary objective of the present invention is to solve the foregoing problem by providing a hollow motor module having a motor and a speed reducer. In the motor, an outer stator contains therein a first rotor, and the first rotor contains therein second rotors, so that when the motor and the speed reducer assembled together, the motor has its first rotor rotate together with the second rotors, thereby substituting gear components in the speed reducer and achieving similar speed-reducing effect.

For accomplishing the objective as mentioned above, the disclosed hollow motor module is made as a combination of a motor and a speed reducer. The motor includes an outer stator, a first rotor and a plurality of second rotors. The first rotor is peripherally provided with a first coil and is installed in the outer stator. Each of the plural second rotors is peripherally provided with a second coil and is installed in the first rotor. The second rotor has a coupling portion extending out of the first rotor. The outer stator has first magnets that work with the first coil to magnetically excite the first rotor to rotate. The first rotor has second magnets for the second rotors. The second magnets work with the corresponding second coils to magnetically excite the second rotors to rotate synchronously. The speed reducer is connected to the coupling portions of the second rotors.

Therein, the speed reducer includes a rotatory seat therein, the rotatory seat being hollow and containing a plurality of rotary teeth that center the rotary axis of the rotatory seat as a circle and are relatively rotatable, the speed reducer having a first ring gear that uses inner teeth thereof to engage with the rotary teeth of the rotatory seat, the plural second rotors having the coupling portions connected to axles of the rotary teeth, the first rotor and the second rotors being all magnetically excited to rotate, so as to drive the rotatory seat to rotate at a speed after first-stage deceleration; the rotatory seat having an axle extending out and rotating therewith, a sun gear being mounted around the axle, a plurality of planetary gears being arranged around the sun gear to engage with the sun gear, and the speed reducer containing a second ring gear that surrounds the planetary gears and engages with the planetary gears at inner teeth thereof, whereby the sun gear on the axle rotate with the rotatory seat, so as to drive the planetary gears to rotate at a speed after second-stage deceleration.

Therein, the speed reducer has a first ring gear that uses inner teeth thereof to engage with a with a plurality of first gears, each of the first gears engaging with a second gear, the second rotors having the coupling portions thereof connected to the second gears, respectively; the first ring gear being coupled with an output shaft, a sun gear being mounted around the output shaft, the speed reducer having a plurality planetary gears arranged around the output shaft for engaging with the sun gear, and the planetary gears peripherally engaging with inner teeth of a second ring gear that is combined with the first ring gear; whereby the first and second gears drive the first ring gear to rotate thereby achieving first-stage deceleration, and then the first ring gear drives the second ring gear that in turn drives the planetary gears to rotate the output shaft, thereby achieving second-stage deceleration.

DETAILED DESCRIPTION OF THE INVENTION

Please refer to FIG. 1 through FIG. 6 for some selected embodiments of the present invention, which are of illustrative nature rather than forming limitation to the scope of the present invention.

Figure 1:
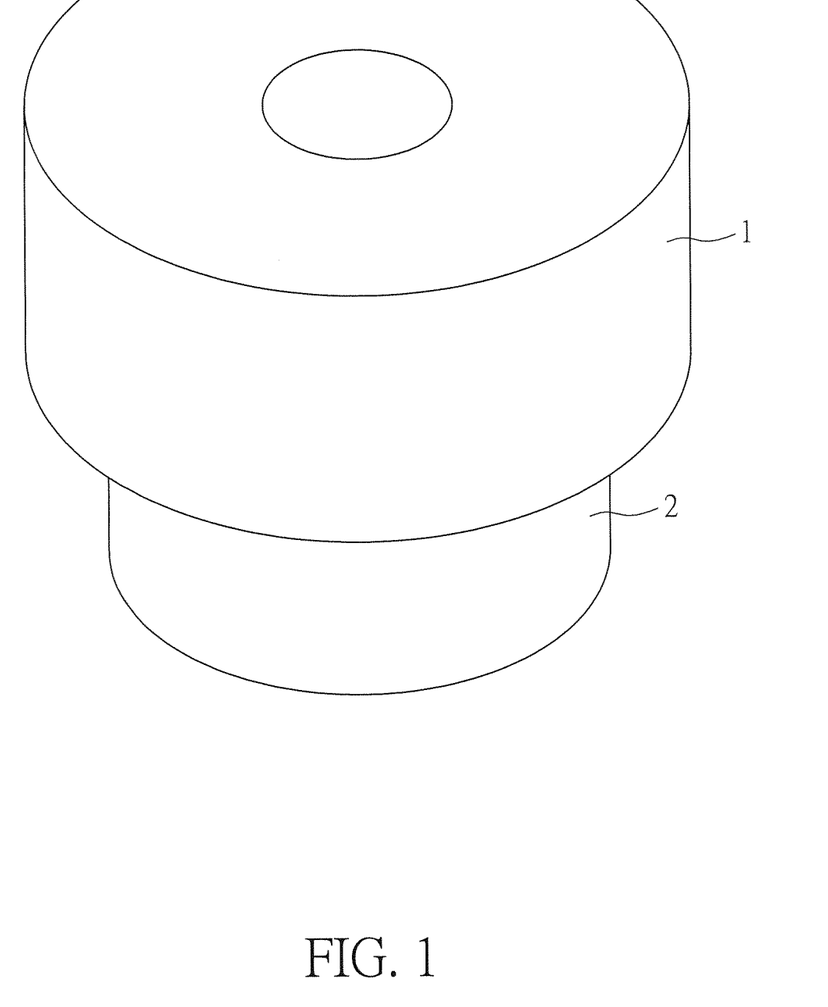
FIG. 1 is a perspective view of a combination of a motor and a speed reducer according to a first embodiment of the present invention.
Figure 2:
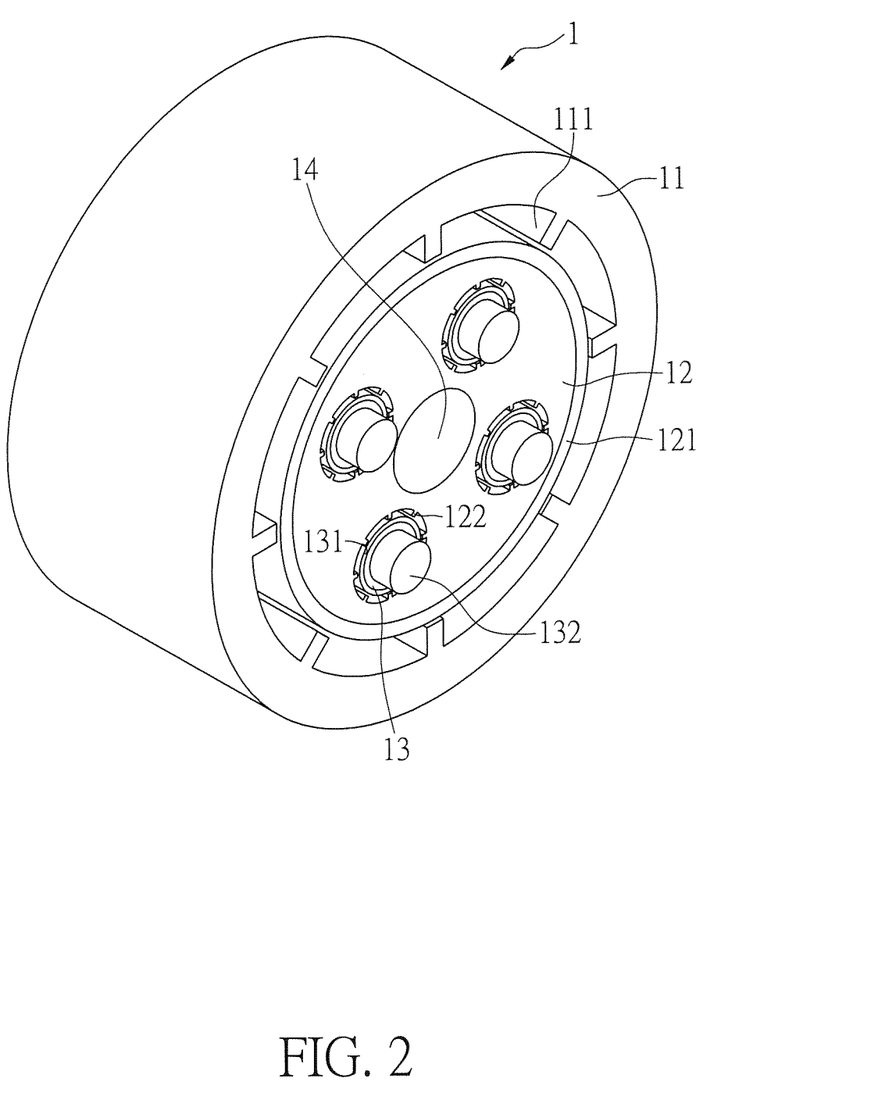
FIG. 2 is a perspective view of the motor according to the first embodiment of the present invention.
Figure 3:
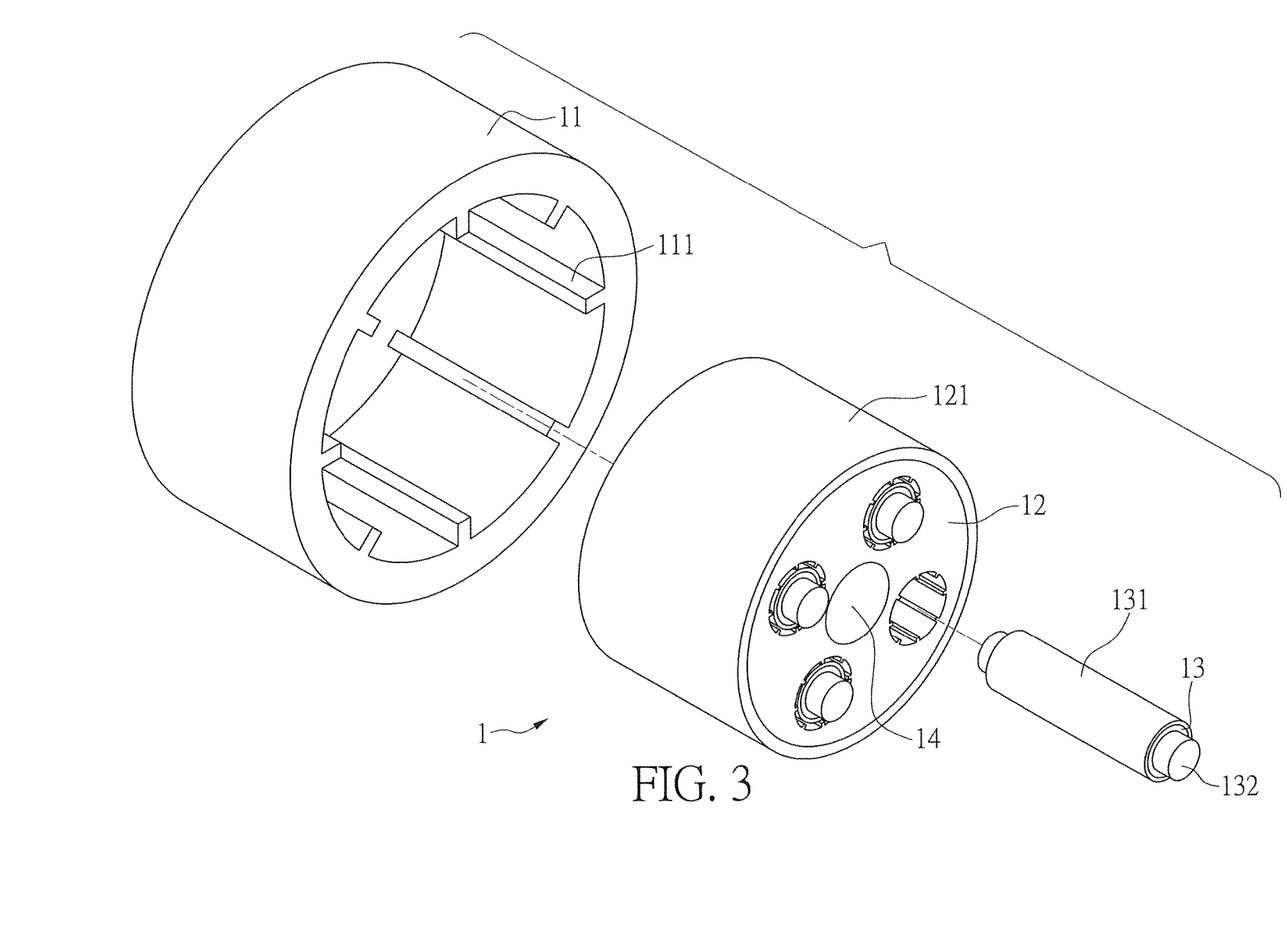
FIG. 3 is an exploded view of the motor of FIG. 2.

In the first embodiment, a hollow motor module, as shown in FIG. 1, is made as a combination of a motor 1 and a speed reducer 2. Referring to FIG. 2 and FIG. 3, the motor 1 comprises an outer stator 11, a first rotor 12, and a plurality of second rotors 13. The first rotor 12 is peripherally provided with a first coil 121 and is installed in the outer stator 11. Each of the second rotors 13 is peripherally provided with a second coil 131 and installed in the first rotor 12, separately. The second rotor 13 has a coupling portion 132 extending out of the first rotor 12. The speed reducer 2 is connected to the second rotors 13 at the coupling portions 132. The outer stator 11 has a plurality of first magnets 111 that work with the first coil 121 to magnetically excite the first rotor 12 to rotate. The first rotor 12 has second magnets 122 each corresponding to one of the second rotors 13. The magnets 122 work with the corresponding second coils 131 to magnetically excite the second rotors 13 to rotate synchronously. The motor 1 has a first hollow portion 14 formed in the first rotor 12.

Figure 4:
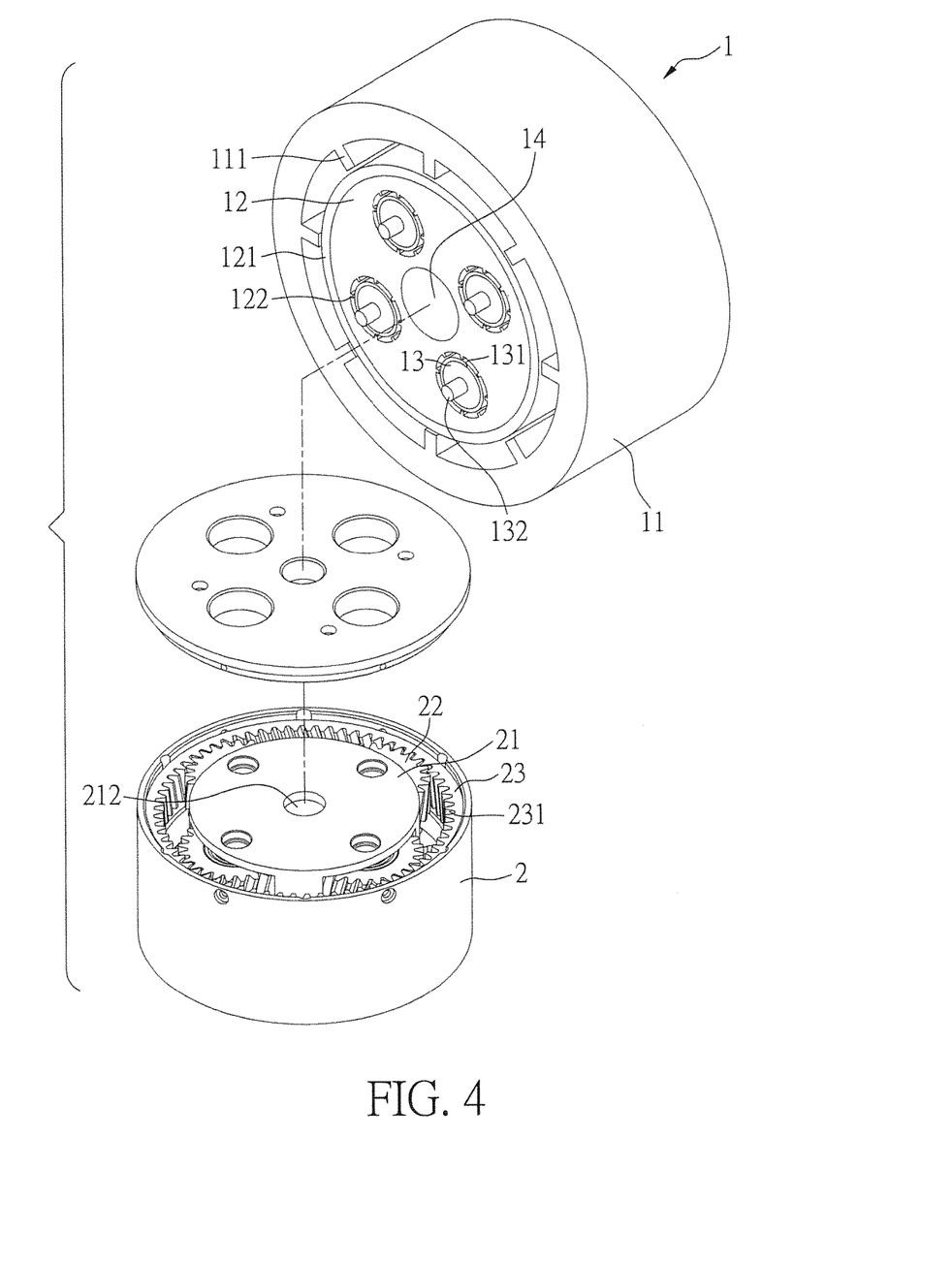
FIG. 4 is a schematic drawing according to the first embodiment of the present invention showing the motor to be assembled with the speed reducer.
Figure 5:
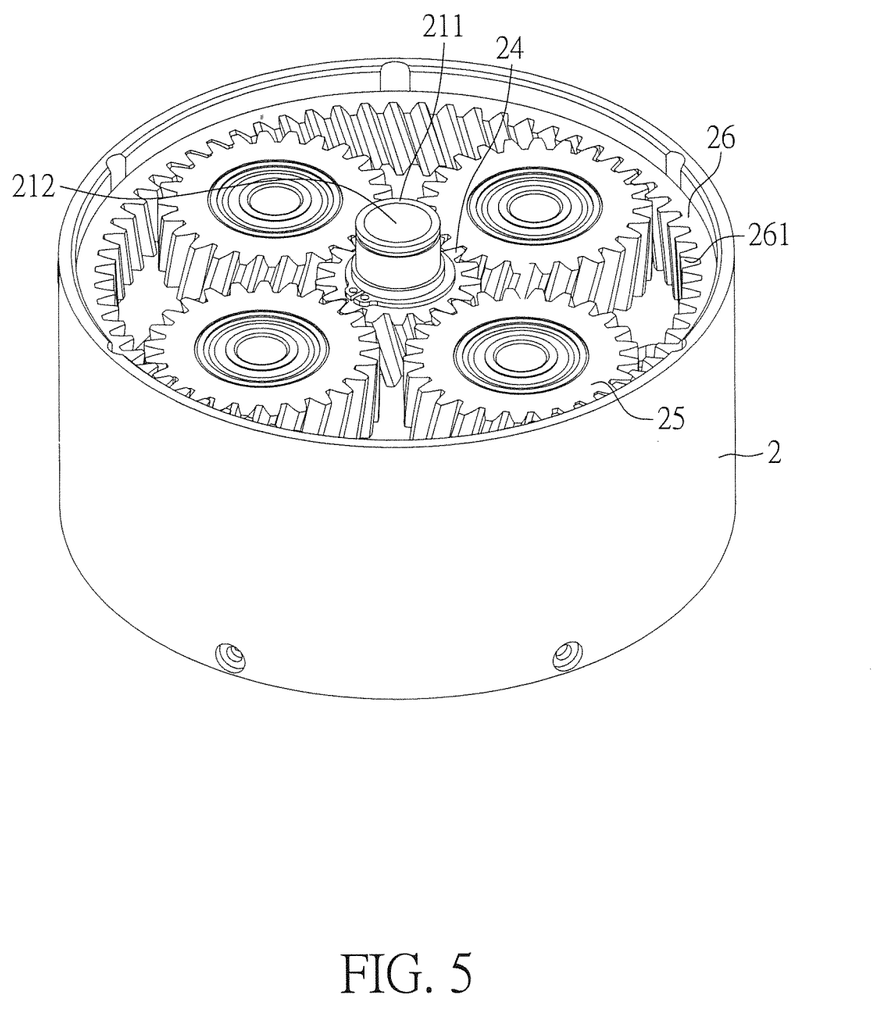
FIG. 5 is s a perspective view of the speed reducer overturned from its position in FIG. 4.

As shown in FIG. 4, in the present embodiment, the speed reducer 2 comprises a rotatory seat 21. The rotatory seat 21 is hollow and contains a plurality of rotary teeth 22 that center the rotatory axis of the rotatory seat 21 as a circle and are relatively rotatable. The speed reducer 2 has a first ring gear 23 that uses its inner teeth 231 to engage with the rotary teeth 22 at the periphery of the rotatory seat 21. The plural second rotors 13 have their coupling portions 132 connected to axles of the rotary teeth 22. The first rotor 12 and the second rotors 13 are all magnetically excited to rotate, so as to drive the rotatory seat 21 to rotate at a speed after first-stage deceleration. As shown in FIG. 5, which shows the speed reducer 2 of FIG. 4 in a reverse direction to have its internal structure exposed, the rotatory seat 21 has an axle 211 extending out and rotating therewith. A sun gear 24 is mounted around the axle 211. A plurality of planetary gears 25 are arranged around the sun gear 24 to engage with the sun gear 24. The speed reducer 2 contains a second ring gear 26 that surrounds the planetary gears 25 and engages with the planetary gears 25 at its inner teeth 261. The sun gear 24 is mounted around the axle 211 and rotates with the rotatory seat 21. The planetary gears 25 are driven by the sun gear 24 to rotate at a speed after second-stage deceleration. The rotatory seat 21 has a second hollow portion 212. When the motor 1 and the speed reducer 2 are assembled together, the first hollow portion 14 and the second hollow portion 212 are communicated with each other for wiring to pass therethrough.

It is clear from the above that the present invention is advantageous. According to the present invention, when the motor 1 has its first rotor 12 rotating with respect to the outer stator 11, the second rotors 13 rotate with respect to the first rotor 12. When the first rotor 12 and the second rotors 13 are all magnetically excited to rotate, since the coupling portions of the second rotors 13 are connected to the rotary teeth 22, the rotary teeth 22 is driven to rotate and in turn drives the rotatory seat 21 to rotate. Then the sun gear 24 on the axle 211 drives the planetary gears 25 to rotate. Therefore, with the first rotor 12 and the second rotors 13 in the motor 1, the speed reducer is enabled to drive the rotatory seat 21 to rotate merely using the connection between the rotary teeth 22 and the coupling portions 132 of the second rotors 13. Unlike the conventional motor module that has to use the sun gear 93 to drive the planetary gears 92 in the front section, and the use the sun gear of the speed-reducing gear set in the rear section to drive the corresponding planetary gears, the present invention uses only a single sun gear 24 to achieve two stage of deceleration.

Figure 6:
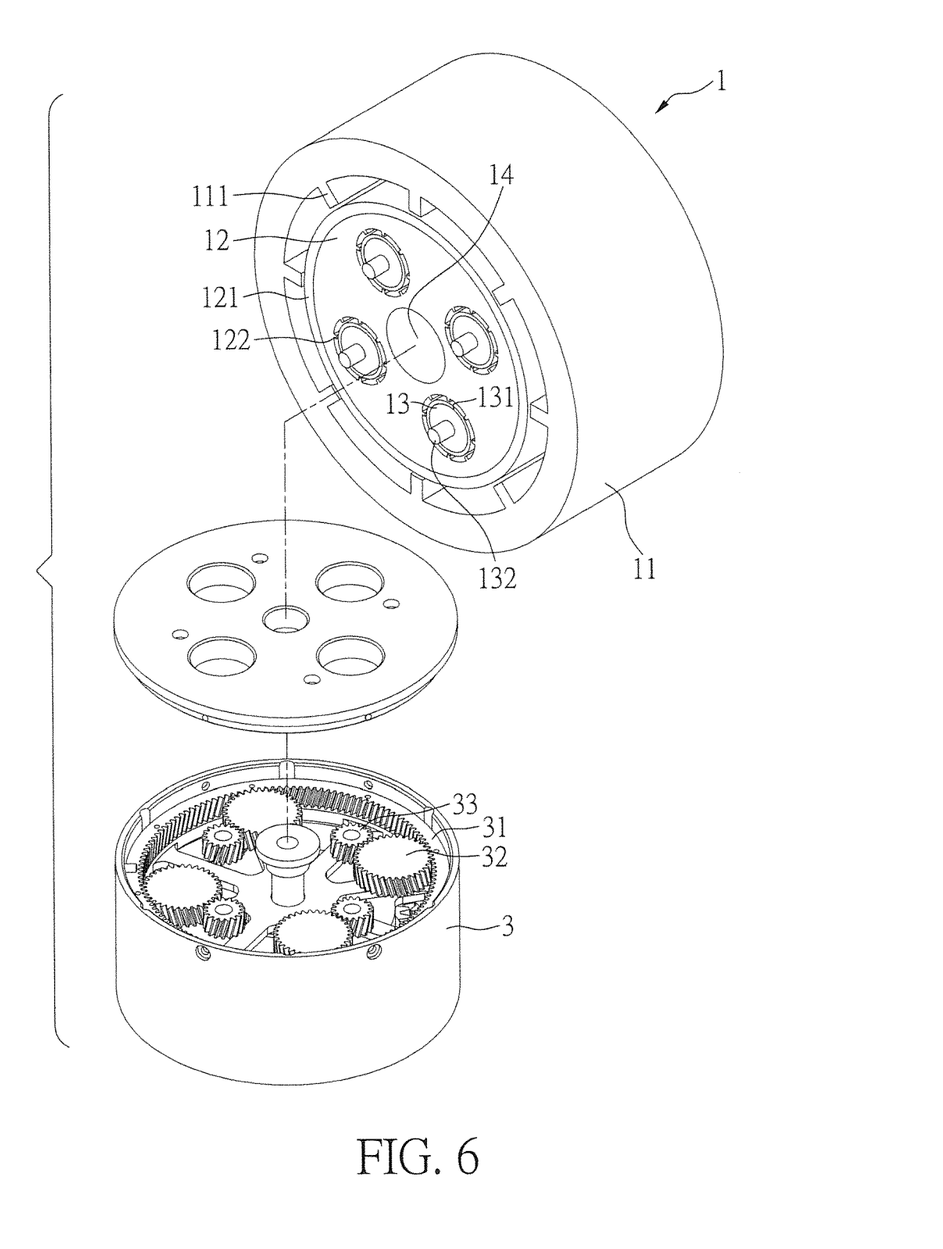
FIG. 6 is a schematic drawing according to a second embodiment of the present invention showing the motor to be assembled with the speed reducer.

Of course, when it comes to the implementation of the present invention, there are many examples with minor differences therebetween. FIG. 6 shows the second embodiment of the present invention. The present embodiment is different from the first embodiment for a modified structure of the speed reducer. In the present embodiment, the speed reducer 3 includes a first ring gear 31. The first ring gear 31 uses its inner teeth to engage with a plurality of first gears 32. Each of the first gears 32 engages with a second gear 33. The second rotors 13 have their coupling portions 132 connected to the second gears 33, respectively. This part belongs to the speed-reducing gear set of the front section of the present embodiment. The speed reducer 3 further has another speed-reducing gear set (not shown) in its rear section. The first ring gear 31 is coupled with an output shaft. A sun gear is mounted around the output shaft. The speed reducer 3 has planetary gears arranged around the output shaft for engaging with the sun gear. The planetary gears peripherally engage with inner teeth of a second ring gear that is combined with the first ring gear 31. The first and second gears 32, 33 drive the first ring gear 31 to rotate thereby achieving first-stage deceleration, and then the first ring gear 31 drives the second ring gear that in turn drives the planetary gears to rotate the output shaft, thereby achieving second-stage deceleration.

In brief, first-stage deceleration is achieved when the first and second gears 32, 33 drive the first ring gear 31 to rotate, and second-stage deceleration is achieved through the process where the first ring gear 31 drives the second ring gear and the second ring gear drives the plural planetary gears 23 and in turn the output shaft 21.

The speed reducer 3 of the present embodiment is a conventional speed reducer. It is to be noted that, in the present invention, the motor 1 may provide first-stage deceleration and work with the speed reducer 2 as described in the first embodiment. Alternatively, in the event that the speed reducer 3 of the present embodiment (i.e. the conventional speed reducer) is used, the motor 1 is able to make the first rotor 12 stay still and act as a stator disk, so that only the second rotors 13 rotate. In this way, the disclosed motor may work with the conventional speed reducer as a driving source.

What is claimed is:

1. A hollow motor module, being a combination of a motor and a speed reducer, the motor including an outer stator, a first rotor and a plurality of second rotors, the first rotor being peripherally provided with a first coil and installed in the outer stator, the second rotors each peripherally provided with a second coil and installed in the first rotor, each of said second rotors having a coupling portion that extends out of the first rotor, the outer stator having a plurality of first magnets that work with the first coil to magnetically excite the first rotor to rotate, and the first rotor having second magnets that each correspond to each of said second rotors and jointly work with the corresponding second coils to magnetically excite the second rotors to rotate synchronously; and the speed reducer being connected to the coupling portions of the second rotors.

2. The hollow motor module of claim 1, wherein the speed reducer includes a rotatory seat therein, the rotatory seat being hollow and containing a plurality of rotary teeth that center the rotatory axis of the rotatory seat as a circle and are relatively rotatable, the speed reducer having a first ring gear that uses inner teeth thereof to engage with the rotary teeth of the rotatory seat, the plural second rotors having the coupling portions connected to axles of the rotary teeth, the first rotor and the second rotors being all magnetically excited to rotate, so as to drive the rotatory seat to rotate at a speed after first-stage deceleration; the rotatory seat having an axle extending out and rotating therewith, a sun gear being mounted around the axle, a plurality of planetary gears being arranged around the sun gear to engage with the sun gear, and the speed reducer containing a second ring gear that surrounds the planetary gears and engages with the planetary gears at inner teeth thereof, whereby the sun gear on the axle rotate with the rotatory seat, so as to drive the planetary gears to rotate at a speed after second-stage deceleration.

3. The hollow motor module of claim 1, wherein the speed reducer has a first ring gear that uses inner teeth thereof to engage with a with a plurality of first gears, each of the first gears engaging with a second gear, the second rotors having the coupling portions thereof connected to the second gears, respectively; the first ring gear being coupled with an output shaft, a sun gear being mounted around the output shaft, the speed reducer having a plurality planetary gears arranged around the output shaft for engaging with the sun gear, and the planetary gears peripherally engaging with inner teeth of a second ring gear that is combined with the first ring gear; whereby the first and second gears drive the first ring gear to rotate thereby achieving first-stage deceleration, and then the first ring gear drives the second ring gear that in turn drives the planetary gears to rotate the output shaft, thereby achieving second-stage deceleration.

\* \* \* \* \*